United States Patent
Schadewald, Jr. et al.

(10) Patent No.: US 6,507,467 B1
(45) Date of Patent: Jan. 14, 2003

(54) COMB SHUNT FOR ESD PROTECTION

(75) Inventors: Frank William Schadewald, Jr., Bloomington, MN (US); Mark James Schaenzer, Eagan, MN (US); Scott Michael Franzen, Champlin, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 151 days.

(21) Appl. No.: 09/640,422

(22) Filed: Aug. 17, 2000

Related U.S. Application Data
(60) Provisional application No. 60/149,529, filed on Aug. 17, 1999.

(51) Int. Cl.⁷ ................................................. G11B 5/52
(52) U.S. Cl. ..................................... 360/323; 360/245.8
(58) Field of Search ........................... 360/323, 244.1, 360/245.8, 246, 264.2, 266.3

(56) References Cited

U.S. PATENT DOCUMENTS

| | | |
|---|---|---|
| 3,648,108 A | 3/1972 | Bailey |
| 4,800,454 A | 1/1989 | Schwarz et al. |
| 5,164,880 A | 11/1992 | Cronin |
| 5,289,336 A | 2/1994 | Gagliano |
| 5,485,333 A | 1/1996 | Yang et al. |
| 5,633,780 A | 5/1997 | Cronin |
| 5,638,237 A | 6/1997 | Phipps et al. |
| 5,644,454 A | 7/1997 | Arya et al. |
| 5,661,896 A | 9/1997 | Erpelding |
| 5,699,212 A | 12/1997 | Erpelding et al. |
| 5,710,682 A | 1/1998 | Arya et al. |
| 5,757,590 A | 5/1998 | Phipps et al. |
| 5,812,349 A | 9/1998 | Shouji et al. |
| 5,812,357 A | 9/1998 | Johansen et al. |
| 5,847,914 A | 12/1998 | Johansen et al. |
| 5,856,740 A | 1/1999 | Rau et al. |
| 5,877,933 A | 3/1999 | Johansen et al. |
| 5,894,333 A | 4/1999 | Wong et al. |

*Primary Examiner*—A. J. Heinz
(74) *Attorney, Agent, or Firm*—Merchant & Gould P.C.

(57) ABSTRACT

An apparatus for protecting a magnetoresistive head from electrostatic discharge. The apparatus includes an actuator assembly including the magnetoresistive head, and a connector board including a plurality of conductive traces in electrical contact with the magnetoresistive head. The connector board defines a plurality of openings therein, each of the openings having sides surfaces in electrical contact with one of the traces. The apparatus further includes a conductive shunting member including a plurality of protruding members adapted to be inserted into the openings and contact the side surfaces of the openings. The shunting member, when so inserted into the openings shorts the traces to provide protection of the magnetoresistive head from electrostatic discharge.

19 Claims, 5 Drawing Sheets

COMB SHUNT FOR ESD PROTECTION

RELATED APPLICATIONS

This application claims the priority of U.S. Provisional Patent Application Ser. No. 60/149,529 entitled "COMB PADDLEBOARD ESD SHUNT" filed Aug. 17, 1999.

FIELD OF THE INVENTION

This application relates to magnetic disc drives and more particularly to the protection of magnetoresistive head structures from damage caused by electrostatic discharge.

BACKGROUND OF THE INVENTION

Disc drives are data storage devices that store digital data in magnetic form on a storage medium on a rotating information storage disc. Modern disc drives include one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g., a read/write head, is used to transfer data between a desired track and an external environment. During a write operation, data is written onto the disc track and during a read operation the head senses the data previously written on the disc track and transfers the information to the external environment.

The heads are mounted on a portion of an actuator assembly via flexures at the ends of a plurality of actuator arms that project radially outward from an actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs. The actuator assembly further includes a series of lead wires that are in electrical contact with leads from the heads down the actuator arm to connect the heads to the disc drive circuitry such that the information can be transferred.

Trends in the disc drive industry have required disc drive manufacturers to provide drives with increased areal densities. In order to meet this growing demand, many advancements in read/write head technology have been implemented. One such advancement was moving from an inductive head design to a magnetoresistive (MR) head structure due to the many advantages a MR head offers.

Although there are many benefits with MR technology, there is one distinct problem. An MR head is 100 times more sensitive to electrostatic discharge (ESD) than the older inductive heads. Furthermore, since their introduction, MR head structures have shrunk in order to meet growing areal density demands, making the MR heads even more sensitive to ESD. The latest MR head technology, called GMR (Giant Magnetoresistive), is sensitive to ESD levels as low as 3 volts, and below.

ESD is an uncontrolled static charge transfer from one object to another. In MR heads, ESD occurs when there is a buildup of charge on various elements of the head or other elements in the read/write assembly that are in electrical contact with the MR element of the head, and the head is momentarily shorted to ground. The charge runs through the MR element into ground, thus creating an ESD pulse that is potentially damaging for the MR element.

ESD is only a minor concern in a completed, and operational disk drive. Once in a completed disc drive, the MR elements on the heads are typically protected. The drive case shields the heads from particulate contamination, human contact and other adverse elements that could cause an ESD event.

However, ESD presents a major problem during manufacture, installation and handling of the head and drive, because drive-level ESD protective measures are not yet in place. Therefore, ESD from human or equipment contact and electric fields can cause damage to the MR structures in the head, thereby reducing effect yield and raising costs.

Because of this constant potential damage to the head from ESD during manufacturing and handling, a method is desired which will protect the head from ESD damage. One such method of MR head protection is by shorting together the leads that connect the head contacts. By shorting the head leads, a low resistance path to ground exists. Therefore, the ESD pulse is directed through the short and bypasses the MR structure, thereby protecting the head.

However, when the head is required to function, the electrical shunt will also short out any electrical output from the head. Therefore, a method is required to not only apply the shunt during the manufacturing and building process, but also remove the shunt from the head during electrical testing and final installation of the head in the disk drive.

Many shunting devices and methods used in the art are complex, extensive, difficult to install and remove, and do not allow for the repeated application and removal of the shunt. Therefore, there is a need in the relevant art to overcome the shortcomings of the traditional ESD protection mechanisms.

SUMMARY OF THE INVENTION

Against this backdrop the present invention has been developed. The present invention is an apparatus and method for providing ESD protection for a MR head.

In accordance with one preferred embodiment, the invention can be implemented as an apparatus for protecting a head from electrostatic discharge. The apparatus includes a connector board including a plurality of conductive traces in electrical contact with the head. The connector board defines a plurality of openings therein, each of the openings being in electrical contact with one of the traces. The apparatus further includes a shunting member including a plurality of protruding members adapted to be inserted into the openings such that the shunting member shorts the traces to provide protection of the head from electrostatic discharge.

The invention can be implemented in accordance with another preferred embodiment as simply the shunting member for protecting a head of an assembly from electrostatic discharge. As environment, the magnetoresistive assembly includes a plurality of conductive traces in electrical contact with the head. The shunting member includes a conductive body portion, and a plurality of protruding conductive members in electrical contact with and extending from the body portion. The protruding members are adapted to contact the conductive traces of the assembly to short the traces to provide protection of the head from electrostatic discharge.

The shunting member, and apparatus and methods, of some embodiments of the invention provide many advantages. In some embodiments, the shunting apparatus is easily and quickly applied and removed. The time it takes to apply the shunt is often on the order of seconds, and removal can be even quicker. This means that the shunt will not significantly delay production or testing. Because the shunting apparatus and method of this invention do not involve hard bonded or soldered shunts like some other methods, application and removal of the shunt can be completed numerous times. This is advantageous for head re-testing and for end-users who do not possess the capability of outfitting their facility with special shunt removal equipment. In some embodiments, the only equipment necessary to apply or remove the shunt is a tweezers or similar device to insert or remove the shunt member from openings in the connector board.

These and various other features as well as advantages which characterize the present invention will be apparent from a reading of the following detailed description and a review of the associated drawings. The embodiments of the invention disclosed herein are to be considered merely as illustrative, and the invention is limited in scope only as specified in the appended claims.

DETAILED DESCRIPTION

The invention provides ESD protection for MR elements on an MR head by shorting or "shunting" the electrical leads to the head by the use of a novel shunting apparatus and method. It should be understood that as used herein, the terms "magnetoresistive" or "magnetoresistive elements" are intended to include both magnetoresistive ("MR") and giant magnetoresistive ("GMR") elements.

Figure 1:
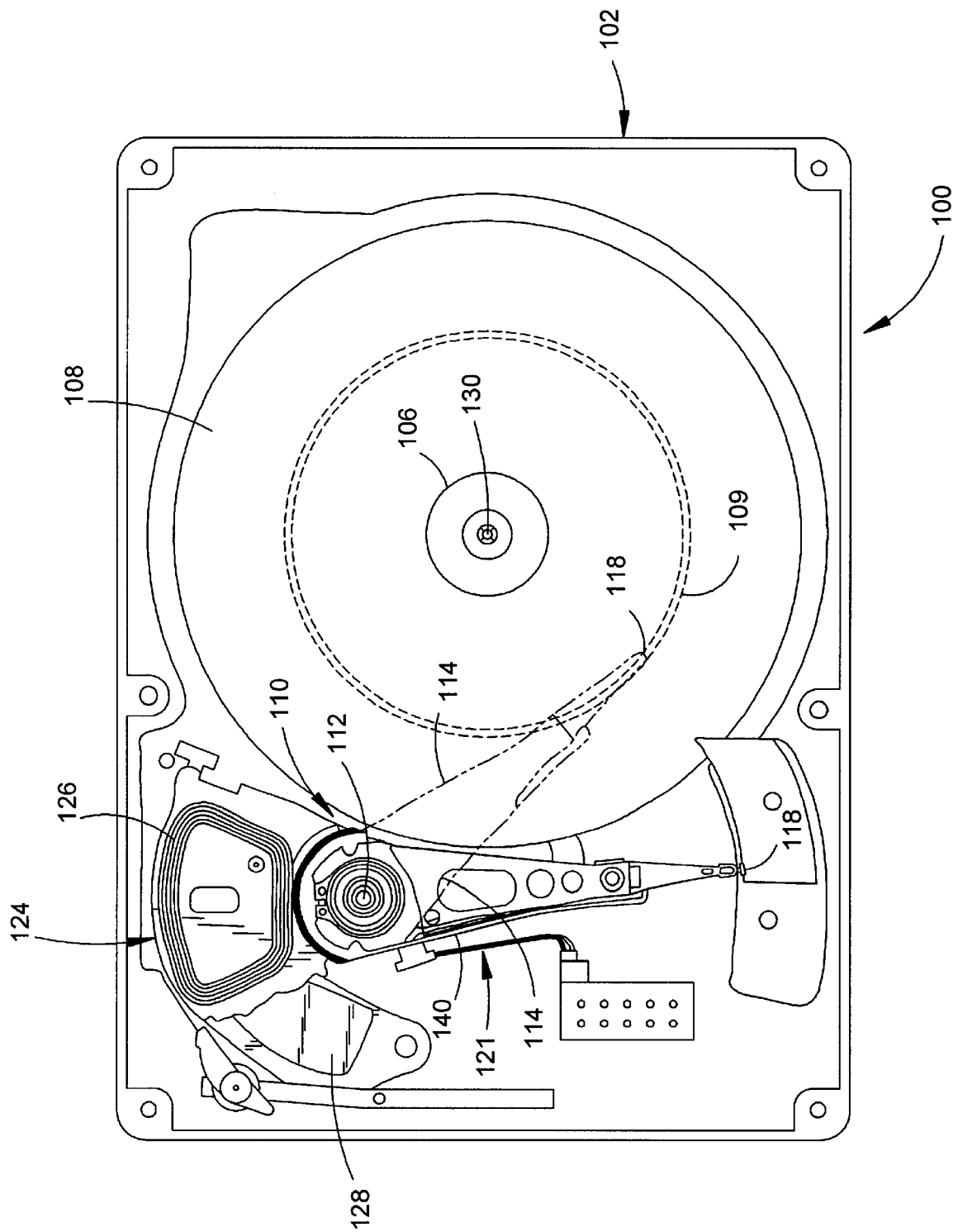
FIG. 1 is a top plan view of a disc drive, with its top cover removed, including an actuator assembly incorporating ESD protection features in accordance with one preferred embodiment of the invention.

As environment for an actuator assembly 110 incorporating ESD protection features in accordance with one preferred embodiment of the invention, FIG. 1 is a top view of a disc drive 100. The disc drive 100 includes a base plate 102 to which various components of the disc drive 100 are mounted. A top cover (not shown) cooperates with the base 102 to form an internal, sealed environment for the disc drive 100 in a conventional manner. The components include a disc drive motor 106 that rotates one or more information storage discs 108 at a constant high speed. The disc drive spindle motor 106, rotates a spindle 130 on a bearing sleeve (not shown). The spindle 130 carries the one or more information storage discs 108. The spindle 130, and therefore the one or more information storage discs 108, are rotated about the spindle axis of rotation by the spindle motor 106, as is generally known in the art.

Information is written to and read from tracks 109 on the disc 108 through the use of the actuator assembly 110 which rotates about a bearing shaft assembly 112 positioned adjacent the discs 108. The actuator assembly 110 includes an actuator arm 114 which extend towards the disc 108, with one or more flexures 116 extending from the actuator arm 114. Mounted at the distal end of each of the flexures 116 is a head 118 that includes an air bearing slider (not shown) enabling the head 118 to fly in close proximity above the corresponding surface of the associated information storage disc 108. The slider typically houses the MR element, the write element, and pads, which provide electrical contact to these elements. The actuator assembly 110 further includes connection circuitry 121 including electrical connectors 140 and a connector board 142 that interconnects the head 118 with the circuitry of the disc drive 110.

The radial position of the heads 118 is controlled through the use of a voice coil motor (VCM) 124, which typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the heads 118 are caused to move across the surfaces of the discs 108.

It will be understood by those of skill in the art that the invention relates to an ESD shunting apparatus and method that is used primarily during the construction and installation of the actuator assembly 110. The above description of a disc drive 100 incorporating such an actuator assembly 110 is provided for environment. It should be understood that the invention is in no way limited to shunting of actuator assemblies 110 that are for use only in a disc drive. Actuator assemblies incorporating the shunting apparatus and method of the invention are often used in other applications, such as media testing devices, and other such applications.

Figure 2:
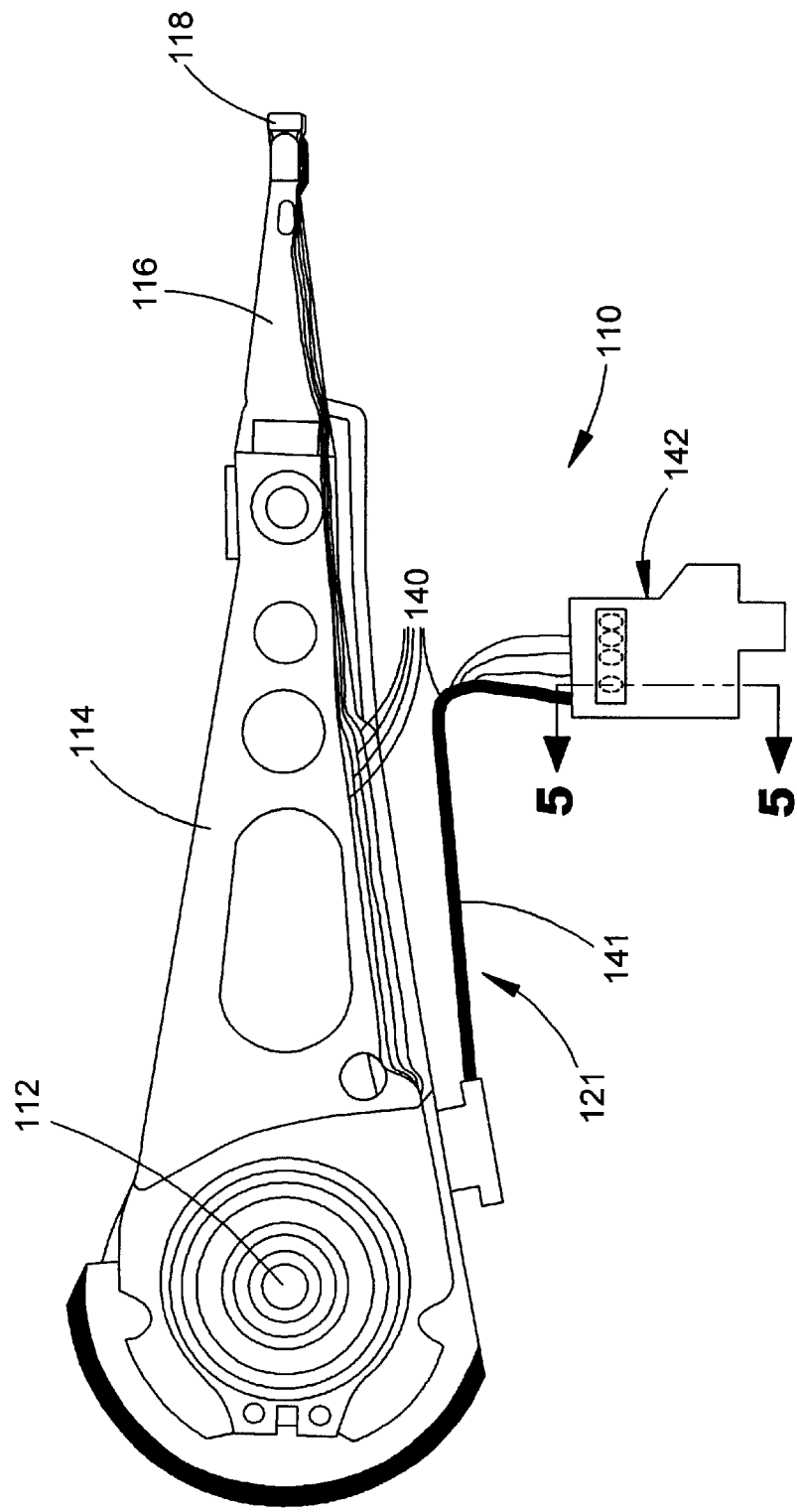
FIG. 2 is a top view of the actuator assembly shown in FIG. 1.

FIG. 2 is a top view of the actuator assembly 110 incorporating ESD protection features in accordance with one preferred embodiment of the invention. The actuator assembly 110 includes the actuator arm 114, the flexure 116, and an MR head 118 mounted at the distal end of the flexure 116. The term "MR head" denotes an integrated unit that preferably includes an inductive write element and an MR read element. However, this does not exclude application of the invention to an actuator assembly 110 including a read head that includes only an MR read element. Furthermore, the ESD protection features of the invention may be applied to actuator assemblies including other types of recording heads, such as non-MR heads.

The actuator assembly 110 further includes connection circuitry 121 that interconnects the head 118 with the circuitry of the device in which the actuator assembly will be used, for example, a disc drive 110, or a media testing device (not shown). The connection circuitry 121 includes electrical connectors 140 which extend between the magnetoresistive elements of the head 118, as well as any additional reading or writing sensor/transducers, and a connector board 142. The electrical connectors 140 are preferably lead wires 140 made of electrically conductive material, such as copper, or other such conductive material. The lead wires 140 are connected to various components of the MR head 118. Preferably, the wires are electrically connected to relatively large conductive pads (not shown) on the MR head 118. Such pads are typically connected to the small MR head elements (not shown).

The lead wires 140 run from the head 118, along the flexure 116 and the actuator arm 114, and thereafter off of the actuator arm 114, and to the connector board 142. The wires 140 are preferably affixed to the flexure 116 and the actuator arm 114 using techniques generally known in the art, for example, by the use of anchors or adhesives, and the like. The lead wires 140 can be held together by a tubular sheath, configured as a wire bundle, or arranged in another similar manner. Preferably, the portion 141 of the lead wires 140 that extend off of the actuator arm 114 and to the connector board 142 are held together by a sheath, or are incorporated into cable, such as a ribbon cable, flex cable, or other such structure.

Figure 3:
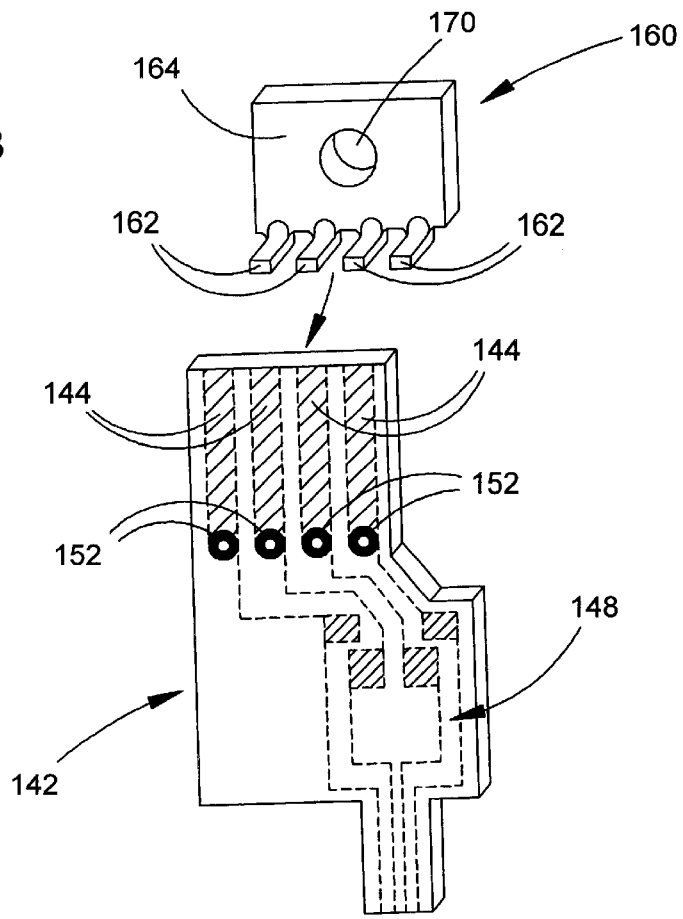
FIG. 3 is a perspective view of the connector board of the actuator assembly of FIG. 2, showing the shunting assembly in an un-shunted position.
Figure 4:
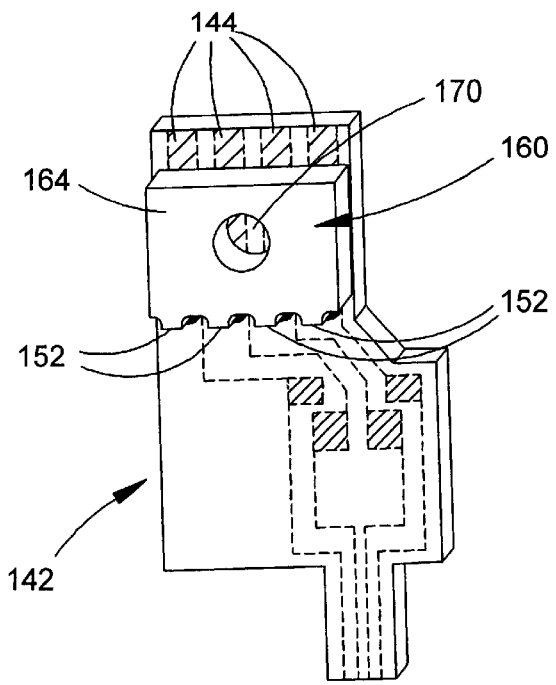
FIG. 4 is a perspective view of the connector board of the actuator assembly of FIG. 2, showing the shunting assembly in a shunted position.

Referring to FIGS. 3 and 4, the connector board 142 includes MR head traces 144 that are adapted to receive, and make electrical contact with, the lead wires 140 to provide a signal path between the MR head 118 and the connector board 142 via the lead wires 140. The traces 144 of the connector board 142 are in turn in electrical contact with additional electrical circuitry 148 of the connector board 142. The additional circuitry 148 of the connector board 142 is adapted to mate with and electrically connect the actuator assembly 110 with the circuitry of the device in which the actuator assembly will be used, for example, a disc drive 100, or a testing device (not shown). Many known connector board designs and arrangements can be used.

Figure 5:
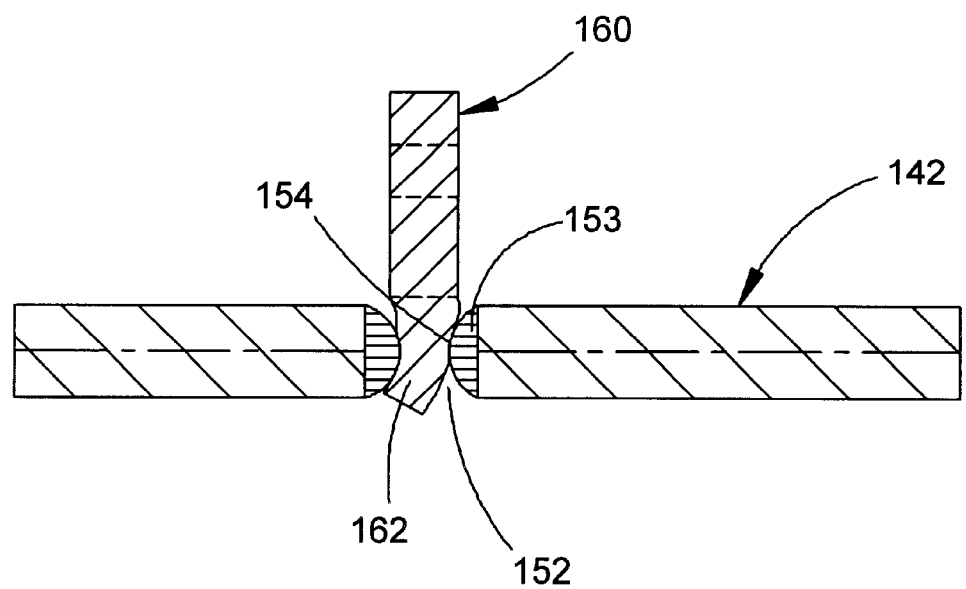
FIG. 5 is a sectional view of the connector board of FIG. 2 taken along lines 5—5 in FIG. 2.

A shunting apparatus is incorporated onto the connector board 142 to protect the MR head elements from ESD during assembly, installation and handling of the actuator assembly 110. The shunting apparatus includes a plurality of openings 152 in the connector board 142. The openings 152 are arranged such that they extend through the middle of the traces 144. In the embodiment shown, there are four traces 144 and therefore four openings 152, respectively. However, those of skill in the art will recognize that in other embodiments, additional or fewer traces and additional or fewer openings can be used, depending upon the number of leads entering the connector board, and the desired shunting activity. Preferably, the diameter of each of these openings 152 is of such a size that protruding members 162 of a shunting member 160 can snugly engage the inner peripheral surfaces 154 of the openings 152, as will be discussed in more detail below. (FIG. 5). A portion of, or the entire inner peripheral surface 154 of, each of the openings 152 includes a conductive material that is in electrical contact with the traces 144. Preferably, annular rings 153 made of a conductive material, such as gold, are used as the inner peripheral surfaces 154 of the openings 152. Preferably, the annular rings are generally hour glass in cross sectional shape, and are inserted into each of the openings 152 to provide the requisite conductive material surfaces 154 in electrical contact with the traces 144.

The shunting apparatus further includes a shunting member 160. The shunting member 160 includes a top support portion 164, and a plurality of downwardly extending portions 162. Preferably, the shunting member 160 resembles a comb, with a row of protruding members 162, or "teeth" jutting from a common support member 164. In the embodiment shown, there are four protruding members 162, but those of skill in the art will recognize that additional or fewer protruding members can be used, depending upon the number of traces to be shunted, and the desired shunting activity. The protruding members 162 are spaced apart, and aligned such that each member 162 can be aligned with an opening 152 in the connector board 142. Preferably, the protruding members 162 are slightly bent in shape to provide a certain degree of spring tension with the inner surfaces 154 of the openings 152 when inserted. An opening 170 can be made through the top support portion 164 of the shunting member 160 to provide for easy engagement of the shunting member 160 with a tool, such as a tweezers (not shown), for easy insertion and removal of the shunting member 160 from the connector board 142. The shunting member 160 will act as the shorting path between electrical traces 144 on the connector board 142. Therefore, the shunting member 160 is made from an electrically conductive material, such as beryllium copper, phosphorus bronze, or other such conductive material.

Referring to FIG. 4, to utilize the shunting characteristic of this apparatus, the protruding portions 162 of the shunting member 160 are inserted into the openings 152 in the connector board 142 such that the protruding portions 162 are in electrical contact with the inner peripheral surfaces 154 of the openings 152. Now, the electrical traces 144 in the connector board 142 are short circuited, or "shunted" through the shunting member 160. Because the connector traces 144 are shunted, and are electrically connected to the head 118, a shorting path away from the head 118 is made. This path runs through the connector traces 144, through the conductive material on the surface 154 of the openings 152 and through the conductive shunt member 160. In this way, ESD pulses will be shunted through the shunt member 160 away from the head 118, and the MR elements in the head 118 are protected from ESD.

Figure 6:
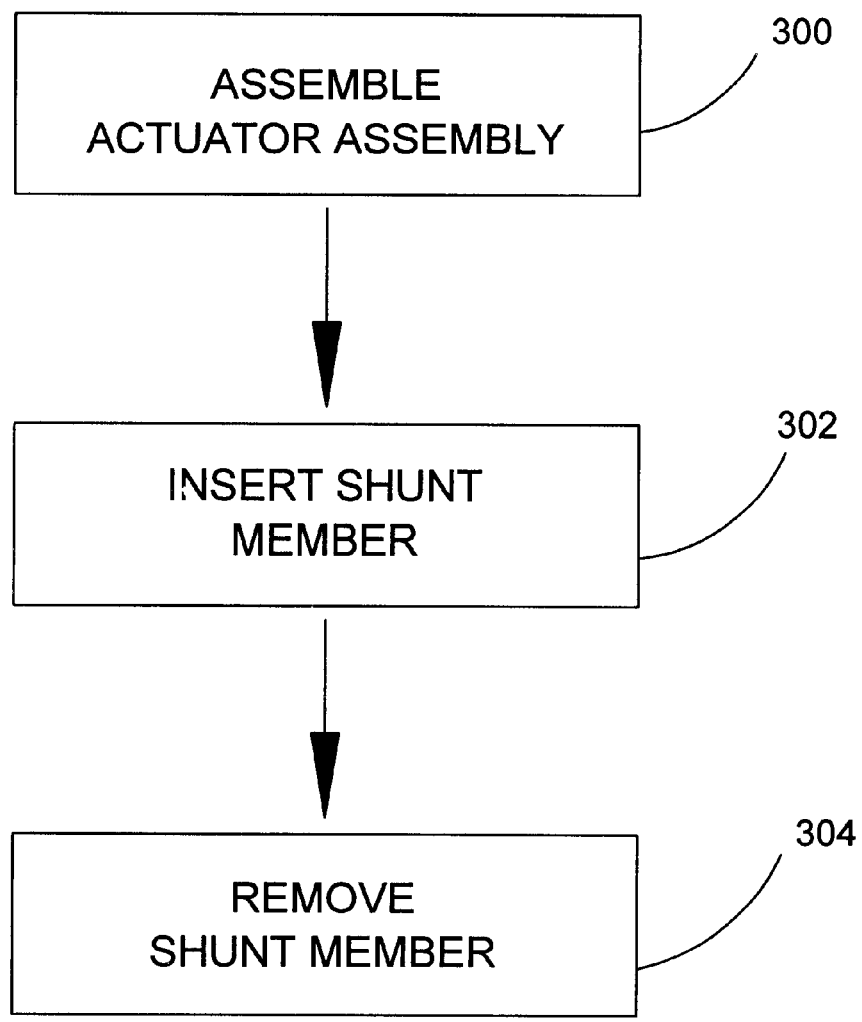
FIG. 6 is a flow chart showing the steps for using the shunting assembly in accordance with a preferred embodiment of the present invention.

FIG. 6 is a flow diagram showing the steps for a shunting method in one preferred embodiment of the present invention. In operation 300, the actuator assembly 110 is manufactured and assembled including the actuator arm 114, the flexure 116, the MR head 118, and connection circuitry including electrical connectors 140 and a connector board 142. The connector board 142 includes the MR head traces 144, and the plurality of openings 152 having peripheral surfaces in electrical contact with the traces 144. In operation 302, the protruding portions 162 of the shunting member 160 are inserted into the openings 152 in the connector board 142 such that the protruding portions 162 are in electrical contact with the inner peripheral surfaces 154 of the openings 152, and the electrical traces 144 in the connector board 142 are short circuited, or "shunted" through the shunting member 160. After shunting, the actuator assembly 110 can be optionally further processed, manufactured, stored, cleaned, installed in a device, or the like, while avoiding EDS that may damage the MR head. In operation 304, the shunting member 160 is removed from the openings 152 in the connector board 142, and the actuator can be tested or placed into operation. Thereafter, steps 302 and 304 can be repeated, as necessary, to attach and remove the shunting member as desired.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art. For example, the embodiments described above involve four traces in a connector board being shunted by a shunting member including four projecting members. Those of skill in the art and others will understand that additional or fewer traces can be shunted using a shunting apparatus having additional or fewer openings in the connector board, and a shunting member with additional or fewer projecting members. Additionally, more than one shunting member can be used on a connector board, dictated only by the desired shunting activity. Many other such modifications, changes and alternatives are also contemplated, and will be apparent to those of skill in the art. Accordingly, all such modifications, changes and alternatives are encompassed in the spirit of the invention disclosed and as defined in the appended claims.

What is claimed is:

1. An apparatus for protecting a head from electrostatic discharge, the apparatus comprising:
   a connector board including a plurality of conductive traces in electrical contact with the head, the connector board defining a plurality of openings therein, each of the openings being in electrical contact with one of the traces; and
   a shunting member including a plurality of protruding conductive members adapted to be inserted into the openings, wherein the plurality of protruding conductive members are in electrical contact with a wall of the openings, and wherein further the walls of the openings are in electrical contact with the plurality of conductive traces, thereby providing an electrical path to short the traces to provide protection of the head from electrostatic discharge.

2. The apparatus of claim 1, wherein the openings include side surfaces, and the side surfaces of the openings are annular rings in electrical contact with the conductive traces.

3. The apparatus of claim 1, wherein the shunting member includes a body portion and four protruding members.

4. The apparatus of claim 1, wherein a connector board includes four conductive traces in electrical contact with the head, and the connector board defines four openings therein, each of the openings having sides surfaces in electrical contact with one of the traces.

5. The apparatus of claim 1, wherein the connector board is adapted to be connected to a media-testing device.

6. The apparatus of claim 1, wherein the connector board is adapted to be connected to a disc drive.

7. The apparatus of claim 1, wherein the head includes magnetoresistive elements.

8. The apparatus of claim 1, further including an actuator assembly connects to the connector board, the actuator assembly comprising an actuator arm, a flexure mounted to the actuator arm, and the head mounted at the distal end of the flexure.

9. The apparatus of claim 8, wherein a connector board includes four conductive traces in electrical contact with the head, and the connector board defines four openings therein, each of the openings having sides surfaces in electrical contact with one of the traces, and the shunting member includes a body portion and four protruding members each adapted to be inserted into one of the openings to shorts the traces.

10. The apparatus of claim 8, wherein the side surfaces of the openings are annular rings in electrical contact with the conductive traces.

11. The apparatus of claim 8, wherein the connector board and actuator assembly are adapted to be connected to a media-testing device.

12. A shunting member for protecting a head of an assembly from electrostatic discharge, the assembly including a plurality of conductive traces in electrical contact with the head, the shunting member comprising:
    a conductive body portion;
    a plurality of protruding conductive members in electrical contact with and extending from the body portion, the protruding members adapted to electrically engage a plurality of connector openings walls, wherein the walls of the openings are in electrical contact with the conductive traces of the assembly to short the traces to provide protection of the head from electrostatic discharge.

13. The shunting member of claim 12, wherein the shunting member includes four protruding members.

14. The shunting member of claim 12, wherein the shunting member is made of beryllium copper, phosphorus bronze, or mixtures thereof.

15. The shunting member of claim 12, wherein the protruding members are adapted to mate with openings in the assembly that are in electrical contact with the head.

16. The shunting member of claim 15, wherein the protruding members are resiliently urged in shape to provide a degree of spring tension with the inner surfaces of the openings when inserted.

17. The shunting member of claim 16, wherein the protruding members are bent in shape.

18. The shunting member of claim 12, wherein the assembly is a magnetoresistive assembly and the head is a magnetoresistive head.

19. An apparatus for protecting a magnetoresistive head from electrostatic discharge, the apparatus comprising:
    an actuator assembly including a magnetoresistive head; and
    means for shunting the magnetoresistive head to protect the head from electrostatic discharge, wherein the means are in electrical contact with a wall of an opening in a connector, which is in electrical contact with a plurality of conductive traces.

* * * * *